United States Patent [19]

McKinley

[11] Patent Number: 4,926,326

[45] Date of Patent: May 15, 1990

[54] COIN-OPERATED MESSAGE DISPLAY SYSTEM

[76] Inventor: Robert E. McKinley, 7756 Whittington Dr., Richmond, Va. 23225

[21] Appl. No.: 231,477

[22] Filed: Aug. 12, 1988

[51] Int. Cl.[5] .............................................. G06F 3/033

[52] U.S. Cl. .................................... 364/410; 364/518; 340/717

[58] Field of Search ........ 364/518, 521, 410, 188–190; 340/717

[56] References Cited

U.S. PATENT DOCUMENTS

| | | | |
|---|---|---|---|
| 3,868,675 | 2/1975 | Firmin | 340/334 |
| 4,293,855 | 10/1981 | Perkins | 340/712 |
| 4,313,227 | 1/1982 | Eder | 455/617 |
| 4,405,984 | 9/1983 | Siegel et al. | 364/410 |
| 4,430,639 | 2/1984 | Bennett | 340/310 A |
| 4,513,295 | 4/1985 | Jones et al. | 346/33 ME |
| 4,531,184 | 7/1985 | Wigan et al. | 340/717 X |
| 4,639,720 | 1/1987 | Rympalski et al. | 340/712 |
| 4,720,709 | 1/1988 | Imamura et al. | 340/815.20 |
| 4,761,641 | 8/1988 | Schreiber | 340/717 |
| 4,774,662 | 9/1988 | Ito et al. | 364/401 |

*Primary Examiner*—Gary V. Harkcom

*Assistant Examiner*—Mark K. Zimmerman

*Attorney, Agent, or Firm*—Richard P. Matthews

[57] ABSTRACT

A coin-operated message display system used by the public under the control or censorship of a system operator. Typical uses are in skating rinks, convention halls, stadiums and other public gathering places. The user inserts a coin, dollar bill or combination thereof to activate the message insertion process. A joy stick controls movement of a cursor to position it over a letter or symbol to be selected in forming the message. An input button is depressed to make an individual selection so as to fill spaces on a matrix in sequential fashion. A delete button and a backspace button facilitate changes and corrections. When the desired message is completed, the user has the option of selecting how the message will enter and exit the display board. The user then presses the transmit button. This signals the system operator at the main central processing unit who reads the message and either approves or disapproves the message. If approved, the message is stored in a memory unit for display in time sequence. If disapproved, the message is deleted from the memory. The system operator can also enter messages and fixed advertising messages are also interspersed on the display panel.

9 Claims, 2 Drawing Sheets

COIN-OPERATED MESSAGE DISPLAY SYSTEM

This invention relates to a coin-operated, message display center, and, more particularly, to such a message display center wherein the messages are screened or censored by a systems operator.

BACKGROUND OF THE INVENTION

Heretofore, it has been known to use display panels in order to display messages in convention halls, stadiums, arenas and other large public meeting places. Usually, the presentation and control of the message is instigated by the owner or user of the facility and not by an individual member of the public. A number of years ago coin-operated juke boxes were available in restaurants, night clubs and other gathering places for customers to select music that they would like to hear. The popularity of the juke box has diminished somewhat with the advent of Muzak and other suppliers of music to stores and restaurants on a programmed basis. A need exists for public participation in the messages presented on the display panels. The need may fulfill multifarious purposes. For example, it may be for any of the following:

a. to say hello to a friend;

b. to present a particular greeting to another person or group of people;

c. to announce one's presence;

d. to arrange a meeting with someone;

e. to announce a particular event; and many other purposes.

SUMMARY OF THE INVENTION

In accordance with the present invention, individual members of the public are permitted to place messages on a message display system which also presents advertisements on a predetermined schedule. The invention also permits a system operator to enter messages in addition to performing the function of a censor or screener of inappropriate, obscene or other distasteful messages. In that regard, the display system is provided with a deletion dictionary on a hard disc which contains a pre-compiled list of words, the use of any of which results in an automatic rejection of a proposed message. In addition, the system operator is permitted to use his or her discretion to reject messages which are believed to be inappropriate, malicious, off-color, distasteful or the like.

The individual member of the public, or local user, inputs a coin which activates equipment to allow the user to input a message on a cathode ray tube (CRT) located in the main facility. The term "coin-operated" is defined herein as meaning coins, dollar bills, or combinations thereof. The message is entered or inputted by means of a joy stick and buttons. The joy stick controls the movement of a cursor. The user directs the cursor over a letter or symbol of his choice and then depresses an "input" button. The letter or symbol then fills the next available space on a matrix which simulates the actual display on the display board. This coin activated procedure is timed and if the user runs out of time, the user will then have the option of buying more time. Another button, available to the user, allows the user to delete or back space if necessary.

After the matrix is filled or the message completed, the user then has an option as to how the message enters and exits the display board. For example, the message may enter twinkling and exit in an explosion. There are a variety of other options available with respect to the entry and exit maneuvers, animations or scenarios. When the matrix is completed with respect to a given message and the options decided upon and inputted, the user then depresses the transmit button.

The depressed transmit button signals the main central processing unit (CPU) located in the main facility to send the message to the system operator who reads the message and decides if the message is allowed. If the message is allowed, the system operator indicates this to the main CPU and the CPU will store the message. The system operator has control over all local user messages and can also transmit his or her own messages.

Local user and system operator messages are interspersed with fixed messages from an EPROM located in the main facility. EPROM messages are those containing advertising material which are programmed at the factory and have priority over all local messages. The EPROM messages are controlled by an internal clock. The clock guarantees that the EPROM messages are displayed at certain times and certain frequencies. This does not necessarily mean that the EPROM messages are displayed more often than local user messages since this depends on the demand by local users for time on the display board.

The inherent advantages and improvements of the present invention will become more readily apparent upon reference to the following detailed description of the invention and by references to the drawings wherein:

FIG. 1 is a schematic diagram of the message display system of the present invention; and FIG. 2 is a schematic diagram of the functions performed by the computer program.

DETAILED DESCRIPTION OF THE INVENTION

Figure 1:
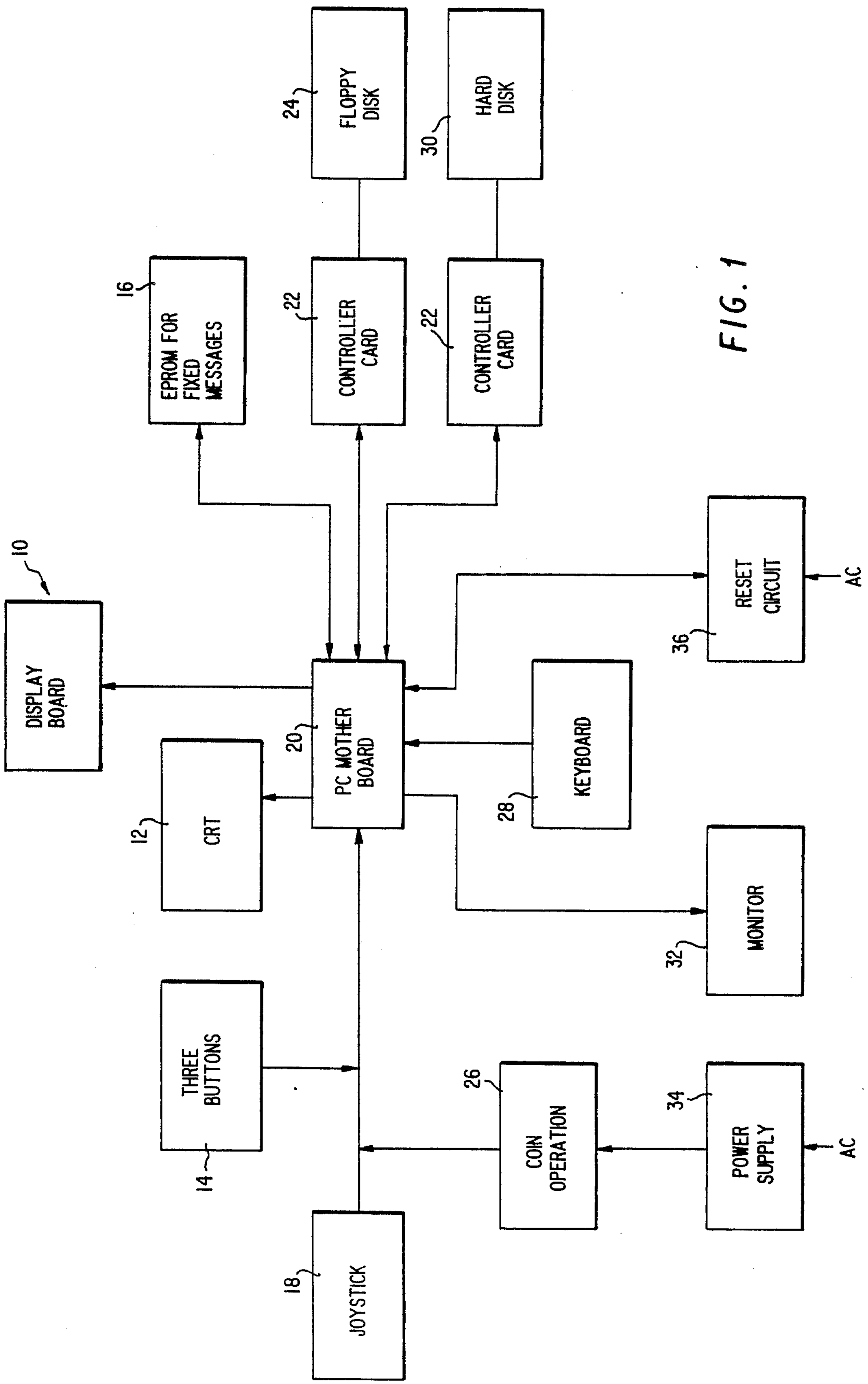

Referring now to FIG. 1 of the drawings, there is illustrated a display board indicated generally at 10 which is controlled by a microprocessor which has its own memory for display screens. The display board also has a serial link for communications. A cathode ray tube (CRT) 12 is housed in the main facility and is viewed by the local user who activates the machine by a coin. Function buttons are connected to the main CPU for designated actions and is illustrated by block 14 entitled "three buttons". These buttons provide for the input of letters or symbols under the influence of a joy stick 18, the deletion of a letter or symbol and finally the inputting of a desired display message.

An EPROM 16, for purposes of fixed messages, advertisements or the like, which are on predefined screens are placed on the display board 10 in accordance with an internal clock. This ensures that the advertiser will have his advertisements placed on the display board an appropriate number of times, and for a proper length of time. A PC mother board 20, or microprocessor control unit, controls the main facility and transfers the messages to the display board. Controller cards 22 control the memory storage and recall functions from an external source. A floppy drive 24 is used for upgrading the main facility microprocessor control unit program and its use is optional.

The coin operation 26 allows an external or local user to activate the main facility in order to make an input thereto with the aid of a joy stick which controls a cursor that is placed over a desired letter or symbol and inputted with the aid of the appropriate buttons 14 to the PC mother board. Keyboard 28 is a detachable keyboard for use by the system operator and also permits the system operator to make entries to the PC mother board 20 for eventual display on the display board 10. These messages may relate to an event that is transpiring at the particular stadium or arena or it may simply be an encouragement for people therein to use the display panel.

Hard disc 30 is an external device for storing programs and displays. The deletion dictionary contains a precompiled list of words which are deemed to be inappropriate and in bad taste for messages to be displayed are contained on such a hard disc 30. This will screen the messages of the local user on behalf of the system operator so that the system operator can make an appropriate decision as to whether to allow or disallow the proposed message prepared by the local user. Monitor 32 is a black and white monitor or screen for the system operator to review the message prepared by the local user and decide upon its allowance for presentation to the display board 10. Power supply 34 provides power to the system to operate the electronic devices of the main facility. Should there be an overload condition such as a current surge, a reset circuit 36 is provided to restore power to the system following the electrical disturbance.

Figure 2:
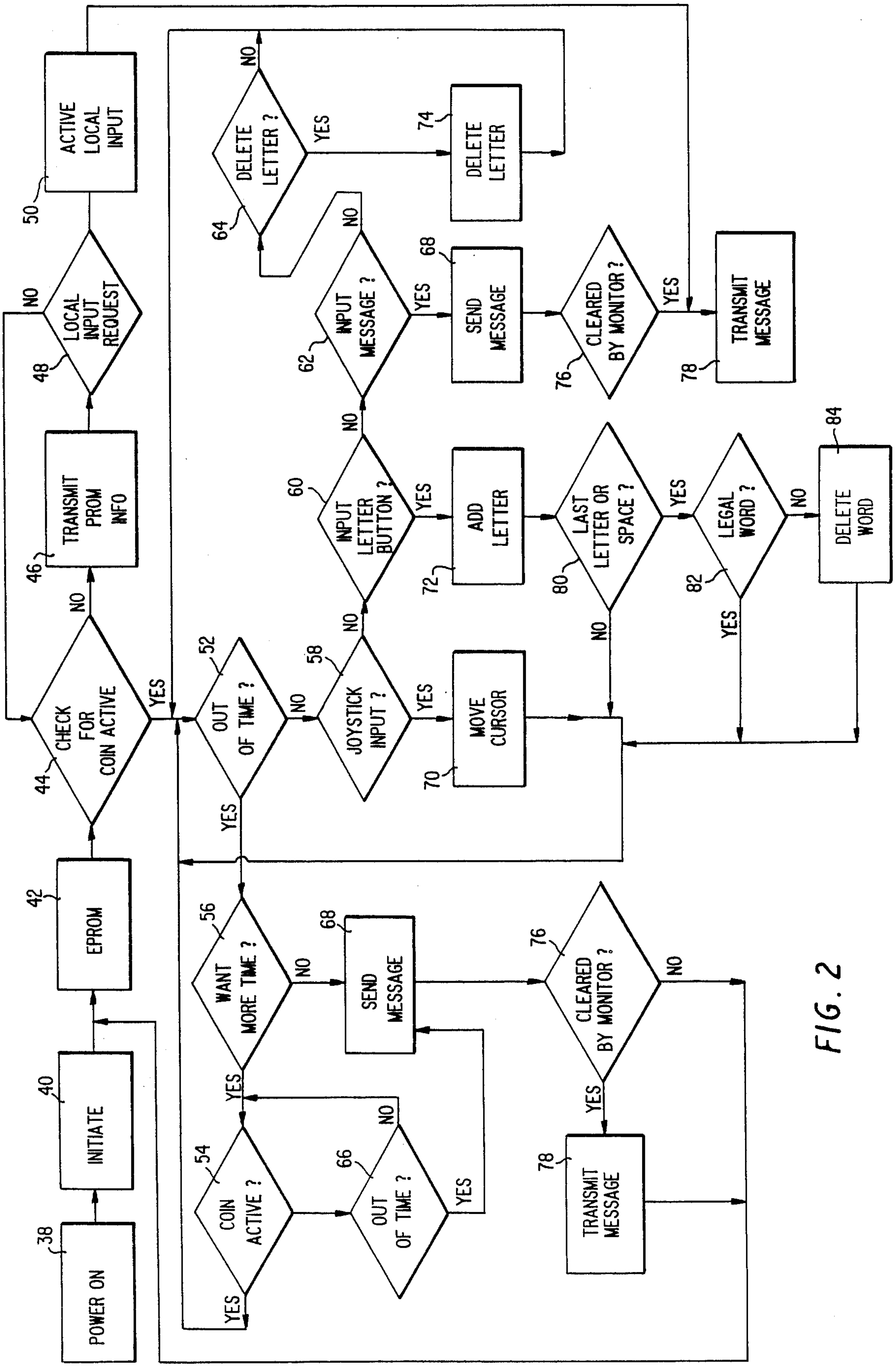

Referring now to FIG. 2, the functions performed by the computer program will now be described. Numeral 38 designates a check of the power being on and numeral 40 indicates the initiation of the load designated program and start. Numeral 42 indicates a check to see if an EPROM message is present. Numeral 44 indicates a check to see if the external user has activated the coin activator shown at 26 in FIG. 1. Numeral 46 indicates a check to see if there has been a transmission of an EPROM message to the display board. Numeral 48 is a check to see if the system operator has requested in input to the display board. Numeral 50 designates the reception of the information from the system operator.

Out of time box 52 constitutes a periodic timing check to see if the local user has exhausted his allotted time. Coin active box 54 is a check to see if the external user has, in fact, activated the coin activator that is the coin operation box 26 of FIG. 1. An inquiry is made at box 56 to inquire as to whether or not the local user wants more time and he will be prompted to input more money to continue his programming operation. Box 56 is a check to see if the microswitches that control joy stick 18 of FIG. 1 have been activated. An inquiry is made to the input letter button 60 to see if the input letter button has been activated. Box 62 is a check to see if the input message button has been activated. Box 64 is a check to see if the delete button has been activated. Again, an out of time check 66 is made to see if the user has used his allotted time up. Box 68, entitled "send message", provides for storage of the message and display of the message for review by the system operator. Box 70 checks whether the cursor has been moved in accordance with the microswitch activation. The add letter box 72 provides for storage of a current letter or symbol which is under the cursor location and proceeds to the next memory location. Box 74 is the delete letter which is activated by the delete letter button to remove the last character or symbol and to move the cursor back to the previous position.

The cleared by monitor box 76 indicates that the system operator approves the message to be transmitted to the display board as indicated by the "yes" projection. The "no" projection indicates that the message is disapproved and has been deleted and removed from the memory.

Box 80, entitled "last letter of space", checks to see if a blank space has been inserted at the last position. The legal word box 82 checks to see if the last word is contained within the illegal word dictionary. Box 84 indicates deletion of the word if it is found in the illegal word dictionary and passage of the message if it is not found. The passage of the message and its progression are indicated by the "yes" and "no" answers that are obtained from the inquiries of the various boxes in FIG. 2.

The message display system of the present invention is not only beneficial to the individual member of the general public of local user, but also ma provide some entertainment and a form of amusement. Utilizing a system operator who practices censorship control over the local users' messages and who automatically screens the messages for illegal words which have been predetermined as being improper for public display on the display panel of the present invention, ensures that the use of the display board will not get out of hand or become abusive.

Various changes and modifications can be made to the preferred embodiment presented above. For example, in place of a joy stick, the local user may employ paper tape, magnetic strip, bar code, key punch, keyboard or a light pen. Instead of using an EPROM for fixed messages, radio signals, microwaves, lightwaves, or any non-wire transmission may be used. The display panel means may include television (TV), fiber optics or multicolor light emitting diodes (LED's).

The special options available for entering and exiting the display panel may also take many other forms than the twinkling and explosion forms already mentioned. For example, the message may silently crawl, pause, sequence, scroll up and down, zoom, blink, wipe on, and venetian to mention other alternatives.

It is also within the purview of this invention to use multiple inputs from a plurality of local users to a single display board as well as employing multiple display boards with or without multiple inputs.

While the invention has been illustrated and described with respect to a preferred embodiment thereof, it will be recognized that the invention may be otherwise variously embodied and practiced within the scope of the claims which follow:

What is claimed is:

1. A coin-operated display panel system which permits local users to deposit coins to gain access to a display panel which comprises:

a. a microprocessor having memory means for storing messages, b. a first cathode ray tube for viewing messages during their course of preparation by a local use, said first cathode ray tube being connected to said microprocessor, c. means to input a message to said microprocessor by said local user, d. a second cathode ray tube for use by a system operator connected to said microprocessor in reviewing, approving, and censoring messages prepared by said local user, i. input means to permit said system operator to input messages of his own to said microprocessor and to delete messages prepared by said local user from the memory of said microprocessor, e. means to insert fixed messages such as advertisements to the memory of said microprocessor,
   i. said means to insert fixed messages being controlled by clock means, and
f. display panel means to display messages stored in the memory of the microprocessor in sequential order with said messages being moved onto and off of said display panel means.

2. A coin-operated display panel system as defined in claim 1 wherein the local user may specify entrance and exit movements of the message.

3. A coin-operated display panel system as defined in claim 1 wherein said local user controls a joy stick to select letters and symbols which are used in the messages prepared by said local user.

4. A coin-operated display panel system as defined in claim 1 including means which senses the message input by said local user for comparing each word of a message prepared by a local user with a pre-compiled list of words deemed inappropriate for messages prepared by said local user which results in deletion of the local user's message from the memory of the microprocessor.

5. A coin-operated display panel system as defined in claim 1 wherein non-volatile memory means are used to store the fixed messages.

6. A coin-operated display panel system as defined in claim 1 wherein the local user may select to animate entry and exit movements of the message.

7. A coin-operated display panel system as defined in claim 1 which includes a plurality of means to input a message to said microprocessor which includes means controlled by said local user and said system operator.

8. A coin-operated display panel system as defined in claim 1 which includes a plurality of display panel means to display messages from said microprocessor.

9. A coin-operated display panel system as defined in claim 8 which includes a plurality of means to input a message to said microprocessor which includes means controlled by said local user and said system operator.

* * * * *